US012770551B2

(12) United States Patent
Cao et al.

(10) Patent No.: US 12,770,551 B2
(45) Date of Patent: Oct. 20, 2026

(54) PIXEL DRIVING CIRCUIT, DISPLAY APPARATUS, AND DRIVING METHOD

(71) Applicants: Chengdu BOE Optoelectronics Technology Co., Ltd., Chengdu (CN); BOE Technology Group Co., Ltd., Beijing (CN)

(72) Inventors: Xilei Cao, Beijing (CN); Yuanyou Qiu, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/992,953

(22) PCT Filed: May 21, 2024

(86) PCT No.: PCT/CN2024/094512
§ 371 (c)(1),
(2) Date: Jan. 9, 2025

(87) PCT Pub. No.: WO2025/001638
PCT Pub. Date: Jan. 2, 2025

(65) Prior Publication Data
US 2026/0100155 A1 Apr. 9, 2026

(30) Foreign Application Priority Data
Jun. 25, 2023 (CN) ......................... 202310747576.3

(51) Int. Cl.
*G09G 3/3233* (2016.01)
*G09G 3/32* (2016.01)

(52) U.S. Cl.
CPC ....... *G09G 3/32* (2013.01); *G09G 2300/0469* (2013.01); *G09G 2300/0819* (2013.01);
(Continued)

(58) Field of Classification Search
None
See application file for complete search history.

(56) References Cited

U.S. PATENT DOCUMENTS

2011/0063197 A1* 3/2011 Chung ................ G09G 3/3233
345/82
2021/0035502 A1 2/2021 Lee et al.

FOREIGN PATENT DOCUMENTS

CN 105427792 A 3/2016
CN 106531074 A 3/2017
(Continued)

OTHER PUBLICATIONS

Translation of CN-115294940-A into English, Gai et al. (Year: 2022).*

*Primary Examiner* — Brian M Butcher
(74) *Attorney, Agent, or Firm* — IPro, PLLC

(57) ABSTRACT

A pixel driving circuit, a display device, and a driving method. The pixel driving circuit includes: a driving transistor (DT), configured to generate a drive current based on a threshold voltage of the driving transistor (DT) and a data voltage; a data writing sub-circuit (001), coupled to a gate of the driving transistor (DT), and configured to, in response to a signal at a scanning signal terminal (Gate), input a data voltage from a data signal terminal (Vdata) into the gate of the driving transistor (DT); a threshold compensation sub-circuit (002), coupled to the driving transistor (DT), and configured to provide a threshold voltage of the driving transistor (DT) to the gate of the driving transistor (DT) in response to a signal at the compensation signal terminal (CM); and a first light-emitting control sub-circuit (003), coupled to the driving transistor (DT).

14 Claims, 6 Drawing Sheets

(52) U.S. Cl.
CPC ............... *G09G 2300/0852* (2013.01); *G09G 2300/0861* (2013.01); *G09G 2310/08* (2013.01); *G09G 2320/0233* (2013.01); *G09G 2320/0247* (2013.01)

(56) References Cited

FOREIGN PATENT DOCUMENTS

| | | | | | |
|---|---|---|---|---|---|
| CN | 108597450 | A | | 9/2018 | |
| CN | 111462698 | A | | 7/2020 | |
| CN | 111696473 | A | | 9/2020 | |
| CN | 112509518 | A | | 3/2021 | |
| CN | 113838421 | A | | 12/2021 | |
| CN | 115188333 | A | | 10/2022 | |
| CN | 115294940 | A | * | 11/2022 | ........... G09G 3/3233 |
| CN | 116665585 | A | | 8/2023 | |
| KR | 20200037893 | A | | 4/2020 | |
| KR | 20210153356 | A | | 12/2021 | |

* cited by examiner

PIXEL DRIVING CIRCUIT, DISPLAY APPARATUS, AND DRIVING METHOD

CROSS-REFERENCES TO RELATED APPLICATIONS

The present disclosure is a National Stage of International Application No. PCT/CN2024/094512, filed on May 21, 2024, which claims priority to Chinese patent application No. 202310747576.3, filed to China National Intellectual Property Administration on Jun. 25, 2023, the entire contents of which are incorporated herein by reference.

TECHNICAL FIELD

The present disclosure relates to the field of display technology, and provides a pixel driving circuit, a display device, and a driving method.

BACKGROUND

For pixel driving circuits composed of all-oxide driving transistors, the driving transistors are sensitive to oxide characteristics (light, water, oxygen, etc.), which can lead to changes in the threshold voltage, and changes in the threshold voltage can lead to unstable currents in the light-emitting process of the driving transistors, and the light-emitting devices in the pixel driving circuits can appear to be flickering and other phenomena.

SUMMARY

Embodiments of the present disclosure provide a pixel driving circuit, a display device, and a driving method for reducing the effect of unstable light emission of a light-emitting device caused by a change in a threshold voltage.

The specific technical solutions provided in the present disclosure are as follows.

In a first aspect, a pixel driving circuit including: a driving transistor, a light-emitting device, a data writing sub-circuit, a threshold compensation sub-circuit, and a first light-emitting control sub-circuit; where the driving transistor is configured to, based on a threshold voltage of the driving transistor and a data voltage, generate a drive current; the data writing sub-circuit is coupled to a gate of the driving transistor, and is configured to, in response to a signal at a scanning signal terminal, input the data voltage at a data signal terminal into the gate of the driving transistor; the threshold compensation sub-circuit is coupled to the driving transistor, and is configured to, in response to a signal at a compensation signal terminal, provide the threshold voltage of the driving transistor to the gate of the driving transistor; and the first light-emitting control sub-circuit is coupled to the driving transistor, and is configured to, in response to a signal at a control signal terminal, provide the drive current generated by the driving transistor to the light-emitting device.

Optionally, the threshold compensation sub-circuit includes a first switching transistor and a first capacitor; where a control terminal of the first switching transistor is coupled to the compensation signal terminal, a first terminal of the first switching transistor is coupled to the gate of the driving transistor, and a second terminal of the first switching transistor is coupled to a second electrode of the driving transistor; and a first terminal of the first capacitor is coupled to the gate of the driving transistor, and a second terminal of the first capacitor is coupled to the second electrode of the driving transistor.

Optionally, the data writing sub-circuit includes a second switching transistor; where a control terminal of the second switching transistor is coupled to the scanning signal terminal, a first terminal of the second switching transistor is coupled to the data signal terminal, and a second terminal of the second switching transistor is coupled to the gate of the driving transistor.

Optionally, the first light-emitting control sub-circuit includes a third switching transistor; where a control terminal of the third switching transistor is coupled to the control signal terminal, a first terminal of the third switching transistor is coupled to a first power supply terminal, and a second terminal of the third switching transistor is coupled to a first electrode of the driving transistor.

Optionally, the pixel driving circuit further includes a first reset sub-circuit; where the first reset sub-circuit is coupled to a first electrode of the driving transistor, and is configured to, in response to a signal at a first reset signal terminal, provide a signal at a reference signal terminal to the first electrode of the driving transistor.

Optionally, the first reset sub-circuit includes a fourth switching transistor; where a control terminal of the fourth switching transistor is coupled to the first reset signal terminal, a first terminal of the fourth switching transistor is coupled to the reference signal terminal, and a second terminal of the fourth switching transistor is coupled to the first electrode of the driving transistor.

Optionally, the pixel driving circuit further includes a second reset sub-circuit; where the second reset sub-circuit is coupled to a gate of the driving transistor, and is configured to, in response to a signal at a second reset signal terminal, provide an initialization signal at an initialization signal terminal to the gate of the driving transistor.

Optionally, the second reset sub-circuit includes a fifth switching transistor; where a control terminal of the fifth switching transistor is coupled to the second reset signal terminal, a first terminal of the fifth switching transistor is coupled to the initialization signal terminal, and a second terminal of the fifth switching transistor is coupled to the gate of the driving transistor.

Optionally, a second electrode of the driving transistor is coupled to the light-emitting device and the threshold compensation sub-circuit.

Optionally, the pixel driving circuit further includes a second light-emitting control sub-circuit; where a second electrode of the driving transistor is coupled to the light-emitting device and the threshold compensation sub-circuit via the second light-emitting control sub-circuit; and the second light-emitting control sub-circuit is configured to, in response to the signal at the control signal terminal, make conduction between a second electrode of the driving transistor and the light-emitting device.

Optionally, the second light-emitting control sub-circuit includes a sixth switching transistor; where a control terminal of the sixth switching transistor is coupled to the control signal terminal, a first terminal of the sixth switching transistor is coupled to the second electrode of the driving transistor, and a second terminal of the sixth switching transistor is coupled to the light-emitting device.

Optionally, the pixel driving circuit further includes a second capacitor; where a first electrode of the second capacitor is coupled to a second electrode of the driving transistor, and a second electrode of the second capacitor is coupled to a fixed voltage signal terminal; where the fixed voltage signal terminal is a first power supply terminal or a second power supply terminal.

Optionally, the driving transistor is a single-gate transistor or a double-gate transistor; where when the driving transistor is the double-gate transistor, a first gate of the driving transistor is coupled to the data writing sub-circuit, and a second gate of the driving transistor is coupled to a second power supply terminal.

Optionally, a first switching transistor, a second switching transistor, a third switching transistor, a fourth switching transistor, and a fifth switching transistor have an N-type polarity.

In a second aspect, a display device includes the above described pixel driving circuit.

In a third aspect, a driving method of the above described pixel driving circuit includes: resetting, by the second reset sub-circuit, an anode of the light-emitting device via a fifth switching transistor and a first switching transistor; in response to the signal at the scanning signal terminal, inputting, by the data writing sub-circuit, the data voltage at the data signal terminal into the gate of the driving transistor; in response to the signal at the compensation signal terminal, providing, by the threshold compensation sub-circuit, the threshold voltage of the driving transistor to the gate of the driving transistor; generating, by the driving transistor, the drive current based on the threshold voltage of the driving transistor and the data voltage; and in response to the signal at the control signal terminal, providing, by the first light-emitting control sub-circuit, the drive current generated by the driving transistor to the light-emitting device.

Other features and advantages of the present disclosure will be set forth in the subsequent specification and, in part, will become apparent from the specification or will be understood by implementing the present disclosure. The objects and other advantages of the present disclosure may be accomplished and obtained by the structure particularly noted in the specification as written, the claims, and the accompanying drawings.

BRIEF DESCRIPTION OF FIGURES

The accompanying drawings illustrated herein are used to provide a further understanding of the present disclosure and form a part of the present disclosure, and the schematic embodiments of the present disclosure and their illustrations are used to explain the present disclosure and do not constitute an undue limitation of the present disclosure. The accompanying drawings are illustrated as below.

DETAILED DESCRIPTION

In order to make the objects, technical solutions and advantages of the embodiments of the present disclosure clearer, the technical solutions of the present disclosure will be described clearly and completely in the following in conjunction with the accompanying drawings in the embodiments of the present disclosure, and it is clear that the described embodiments are a part of the embodiments of the technical solutions of the present disclosure and not all of the embodiments. Based on the embodiments recorded in the present disclosure, all other embodiments obtained by a person of ordinary skill in the art without making creative labor fall within the claimed scope of the technical solution of the present disclosure.

The terms "first", "second", etc. in the specification and claims of the present disclosure and the above-described accompanying drawings are used to distinguish between similar objects, and need not be used to describe a particular order or sequence. It should be understood that the data so used may be interchanged, where appropriate, so that the embodiments of the present disclosure described herein can be implemented using an order other than those illustrated or described herein.

In the related art, the driving transistor is sensitive to oxide properties (light, water, oxygen, etc.), which can lead to a change in its threshold voltage, and the change in the threshold voltage can lead to an unstable current of the driving transistor during light emission, and the light-emitting device in the pixel driving circuit can appear to be flickering and the like.

The preferred embodiments of the present disclosure are described in detail below in conjunction with the accompanying drawings.

Figure 1:
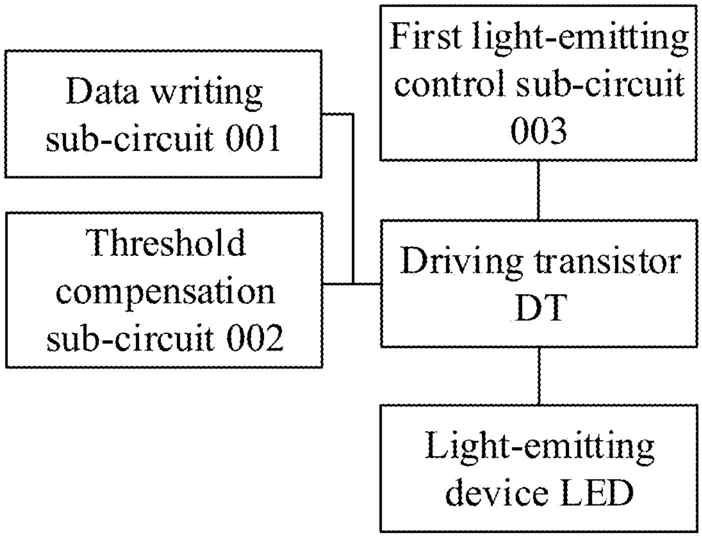
FIG. 1 is a connection schematic diagram of a pixel driving circuit in embodiments of the present disclosure.

Referring to FIG. 1, a pixel driving circuit provided in embodiments of the present disclosure includes: a driving transistor DT, a light-emitting device LED, a data writing sub-circuit 001, a threshold compensation sub-circuit 002, and a first light-emitting control sub-circuit 003.

During the implementation, the above-described driving transistor DT is configured to generate a drive current based on a threshold voltage of the driving transistor DT and a data voltage.

The above-described data writing sub-circuit 001 is coupled to a gate of the driving transistor DT, and is configured to input the data voltage of a data signal terminal Vdata to the gate of the driving transistor DT in response to a signal at a scanning signal terminal Gate.

The above-described threshold compensation sub-circuit 002 is coupled to the driving transistor DT, and is configured to provide the threshold voltage of the driving transistor DT to the gate of the driving transistor DT in response to a signal at a compensation signal terminal CM.

The above-described first light-emitting control sub-circuit 003 is coupled to the driving transistor DT, and is configured to provide the drive current generated by the driving transistor DT to the light-emitting device LED in response to a signal at a control signal terminal EM.

Figure 2:
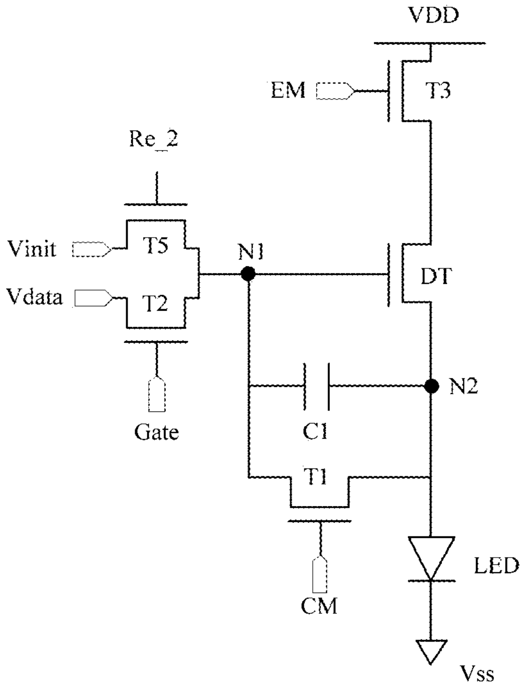
FIG. 2 is a circuit connection diagram of a first pixel driving circuit in embodiments of the present disclosure.

Referring to FIG. 2, the above-described threshold compensation sub-circuit 002 includes a first switching transistor T1 and a first capacitor C1.

The first switching transistor T1 is connected to the other components in FIG. 2 in the following relationship. A control terminal of the first switching transistor T1 is coupled to a compensation signal terminal CM, the first terminal of the first switching transistor T1 is coupled to the gate of the driving transistor DT, and the second terminal of the first switching transistor T1 is coupled to a second electrode of the driving transistor DT.

During the implementation, the first switching transistor T1 is turned on when the signal at the compensation signal terminal CM is a high voltage.

The first capacitor C1 is connected to the other components in FIG. 2 in the following relationship. A first terminal of the first capacitor C1 is coupled to the gate of the driving transistor DT, and a second terminal of the first capacitor C1 is coupled to the second electrode of the driving transistor DT.

During the implementation, the first capacitor C1 is used to store the threshold voltage of the driving transistor DT.

Referring to FIG. 2, the data writing sub-circuit 001 includes a second switching transistor T2.

The second switching transistor T2 is connected to the other components in FIG. 2 in the following relationship. A control terminal of the second switching transistor T2 is coupled to the scanning signal terminal Gate, a first terminal of the second switching transistor T2 is coupled to the data signal terminal Vdata, and a second terminal of the second switching transistor T2 is coupled to the gate of the driving transistor DT.

During the implementation, when the signal at the scanning signal terminal Gate is a high voltage, the second switching transistor T2 is turned on, and the signal at the data signal terminal Vdata reaches a first node via the turned-on second switching transistor T2.

Referring to FIG. 2, the first light-emitting control sub-circuit 003 includes a third switching transistor T3.

The third switching transistor T3 is connected to the other components in FIG. 2 in the following relationship. A control terminal of the third switching transistor T3 is coupled to the control signal terminal EM, a first terminal of the third switching transistor T3 is coupled to a first power supply terminal Vdd, and a second terminal of the third switching transistor T3 is coupled to a first electrode of the driving transistor DT.

During the implementation, when the signal at the control signal terminal EM is a high voltage, the third switching transistor T3 is turned on, and the signal at the first power supply terminal Vdd reaches the driving transistor DT through the turned-on third switching transistor T3.

Figure 3:
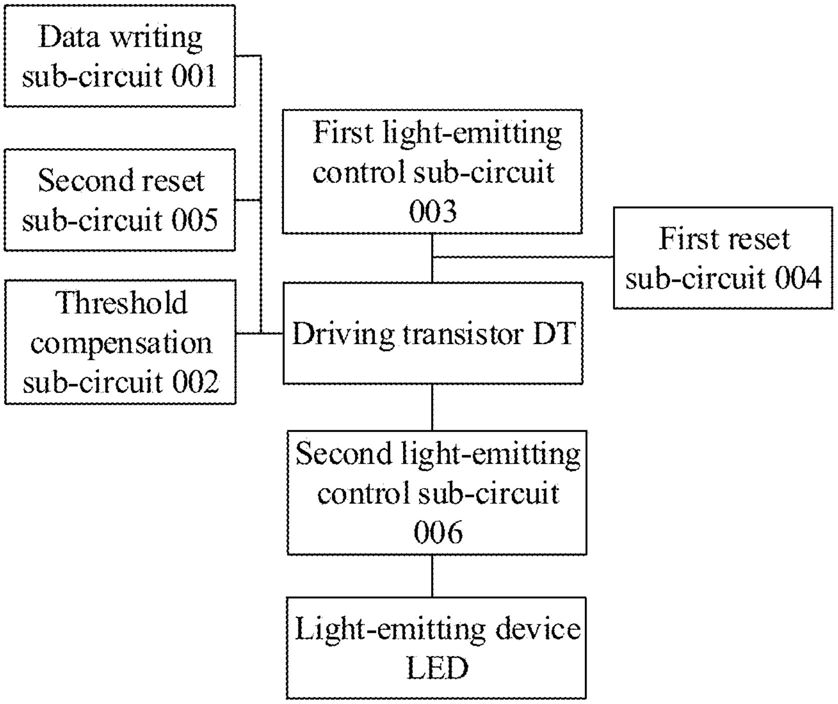
FIG. 3 is a connection schematic diagram of another pixel driving circuit in embodiments of the present disclosure.

Referring to FIG. 3, the above-described pixel driving circuit further includes a first reset sub-circuit 004, where the first reset sub-circuit 004 is coupled to the first electrode of the driving transistor DT, and configured to, in response to a signal at a first reset signal terminal Re_1, provide a signal at a reference signal terminal Vref to the first electrode of the driving transistor DT.

During the implementation, the above-described first reset sub-circuit 004 is mainly used to perform a reset for a third node of the driving transistor DT.

Figure 4:
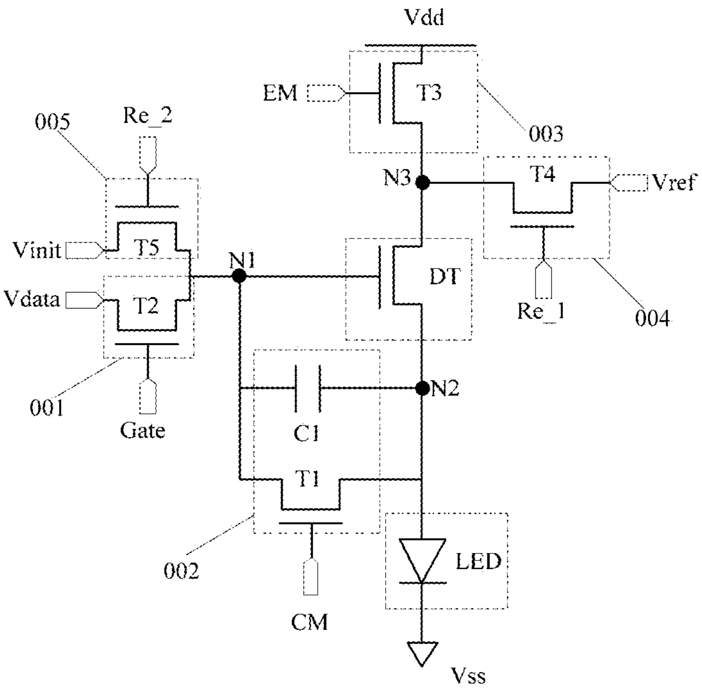
FIG. 4 is a circuit connection diagram of a second pixel driving circuit in embodiments of the present disclosure.

Referring to FIG. 4, the above-described first reset sub-circuit 004 includes a fourth switching transistor T4.

The fourth switching transistor T4 is connected to the other components in FIG. 4 in the following relationship. A control terminal of the fourth switching transistor T4 is coupled to the first reset signal terminal Re_1, a first terminal of the fourth switching transistor T4 is coupled to the reference signal terminal Vref, and a second terminal of the fourth switching transistor T4 is coupled to the first electrode of the driving transistor DT.

During the implementation, when the signal at the first reset signal terminal Re_1 is a high voltage, the fourth switching transistor T4 is turned on, and the signal at the reference signal terminal Vref reaches the third node through the turned-on fourth switching transistor T4.

Referring to FIG. 4, the above-described pixel driving circuit further includes a second reset sub-circuit, where the second reset sub-circuit is coupled to the gate of the driving transistor DT, and the second reset sub-circuit is configured to provide an initialization signal at an initialization signal terminal Vinit to the gate of the driving transistor DT in response to a signal at a second reset signal terminal Re_2.

During the implementation, the above-described second reset sub-circuit 005 is mainly used to perform a reset for the first node of the driving transistor DT.

Referring to FIG. 4, the second reset sub-circuit includes a fifth switching transistor T5.

The fifth switching transistor T5 is connected to the other components in FIG. 4 in the following relationship. A control terminal of the fifth switching transistor T5 is coupled to the second reset signal terminal Re_2, a first terminal of the fifth switching transistor T5 is coupled to the initialization signal terminal Vinit, and a second terminal of the fifth switching transistor T5 is coupled to the gate of the driving transistor DT.

During the implementation, when the signal at the second reset signal terminal Re_2 is a high voltage, the fifth switching transistor T5 is turned on, and the signal at the initialization signal terminal Vinit reaches the first node through the turned-on fifth switching transistor T5.

Referring to FIG. 4, the second electrode of the driving transistor DT is coupled to the light-emitting device LED and the threshold compensation sub-circuit 002.

Referring to FIG. 4, the above-described pixel driving circuit further includes a second light-emitting control sub-circuit 006, where the second electrode of the driving transistor DT is coupled to the light-emitting device LED and the threshold compensation sub-circuit 002 through the second light-emitting control sub-circuit 006.

During the implementation, the second light-emitting control sub-circuit 006 is configured to make conduction between the second electrode of the driving transistor DT and the light-emitting device LED in response to the signal at the control signal terminal EM.

Figure 5:
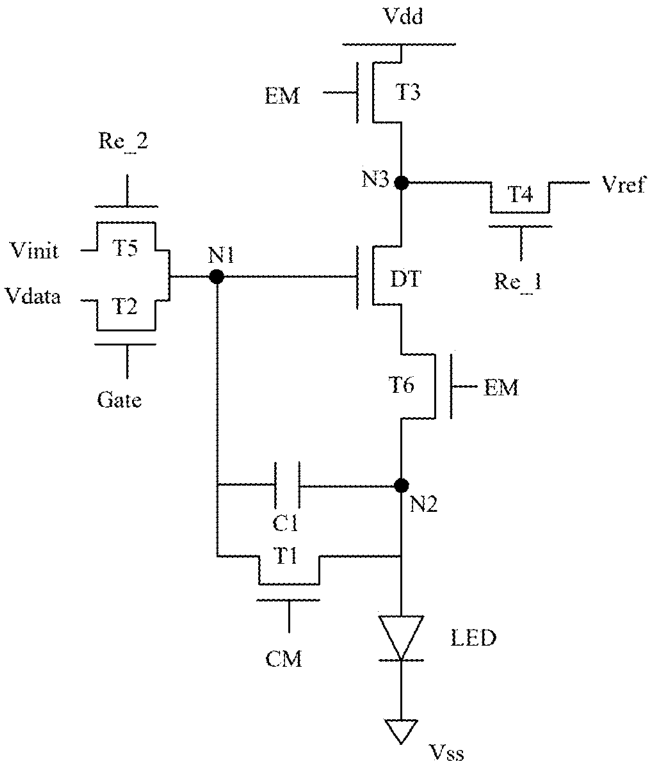
FIG. 5 is a circuit connection diagram of a third pixel driving circuit in embodiments of the present disclosure.

Referring to FIG. 5, the second light-emitting control sub-circuit 006 includes a sixth switching transistor T6.

The sixth switching transistor T6 is connected to the other components in FIG. 5 in the following relationship. A control terminal of the sixth switching transistor T6 is coupled to the control signal terminal EM, a first terminal of the sixth switching transistor T6 is coupled to the second electrode of the driving transistor DT, and a second terminal of the sixth switching transistor T6 is coupled to the light-emitting device LED.

During the implementation, when the signal at the control signal terminal EM is a high voltage, the sixth switching transistor T6 is turned on, and the signal at the first power supply terminal Vdd reaches the light-emitting device LED through the driving transistor DT, the turned-on sixth switching transistor T6. The above-described sixth switching transistor T6 may be turned on and off according to the preset PWM waveform, so that the light-emitting device LED can be further controlled to be turned on and off through the sixth switching transistor T6. That is, in order to make the light-emitting current of the light-emitting device LED more delicate, the above-described sixth switching transistor T6 may be controlled by the PWM waveform.

Figure 6:
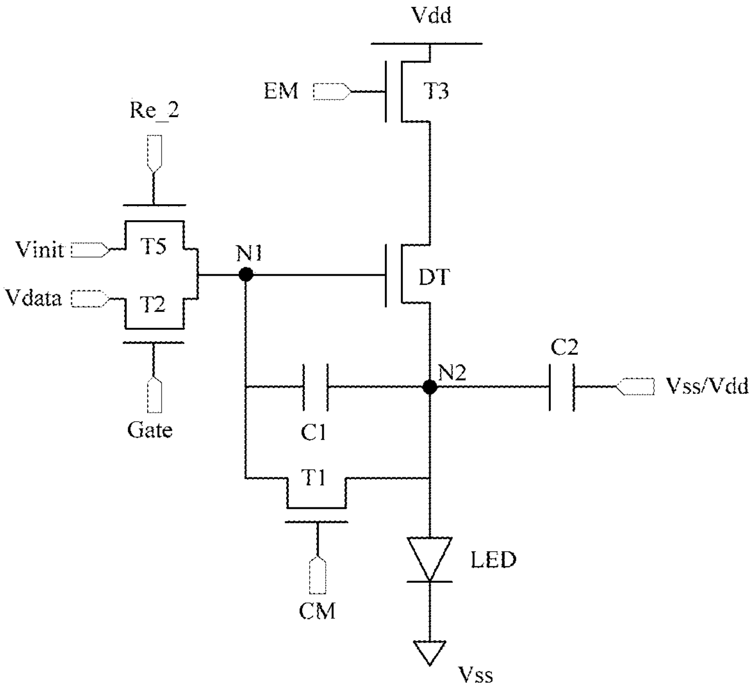
FIG. 6 is a circuit connection diagram of a fourth pixel driving circuit in embodiments of the present disclosure.
Figure 7:
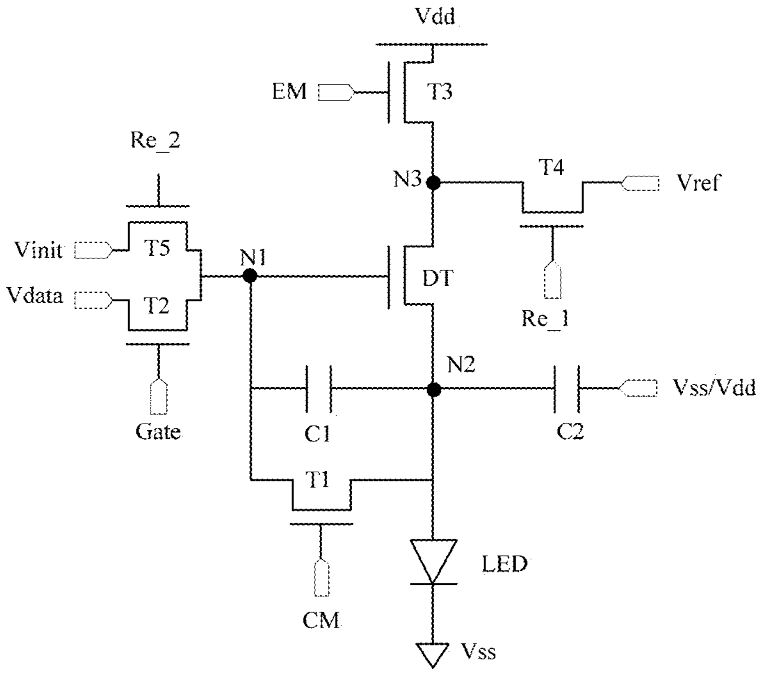
FIG. 7 is a circuit connection diagram of a fifth pixel driving circuit in embodiments of the present disclosure.

Referring to FIGS. 6 and 7, the above-described pixel driving circuit further includes a second capacitor C2, where a first electrode of the second capacitor C2 is coupled to the second electrode of the driving transistor DT, and a second electrode of the second capacitor C2 is coupled to a fixed voltage signal terminal. The fixed voltage signal terminal is the first power supply terminal Vdd or a second power supply terminal Vss.

The original light-emitting current of the light-emitting device LED is generated by the data voltage of the data signal terminal Vdata via the first capacitor C1 and the driving transistor DT, and after setting up the above-described second capacitor C2, the light-emitting current of the light-emitting device LED is generated by the data voltage of the data signal terminal Vdata via the first capacitor C1, the second capacitor C2, and the driving transistor DT, which makes the light-emitting current of the light-emitting device LED at the light-emitting stage is more delicate.

In order to make the connection of the circuit more flexible, in other embodiments, the above-described driving transistor DT is a single-gate transistor or a double-gate transistor.

When the driving transistor DT is a single-gate transistor, it is connected in the above pixel driving circuit as shown in any one of FIG. 2, FIG. 4, FIG. 5, FIG. 6, or FIG. 7.

Figure 8:
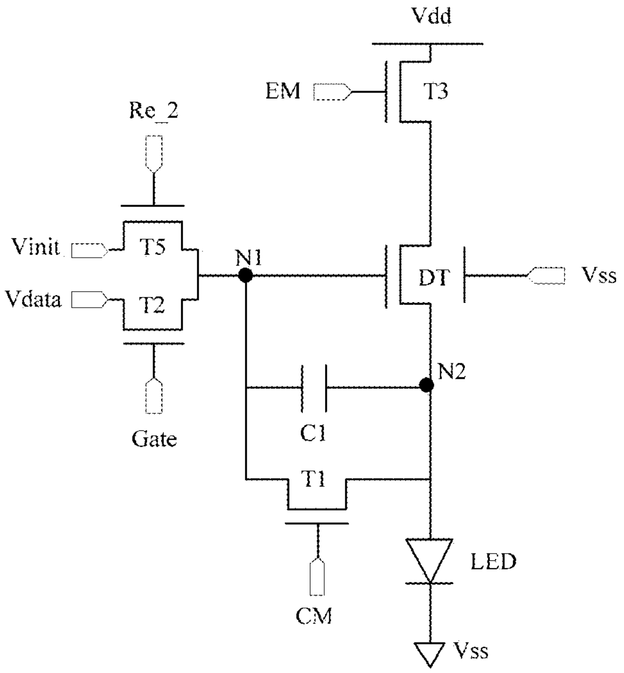
FIG. 8 is a circuit connection diagram of a sixth pixel driving circuit in embodiments of the present disclosure.

When the driving transistor DT is a double-gate transistor, referring to FIG. 8, a first gate of the driving transistor DT is coupled to the data writing sub-circuit 001, and a second gate of the driving transistor DT is coupled to the second power supply terminal Vss.

When the second gate of the driving transistor DT is coupled to the second power supply terminal Vss, it can act as a light blocker for the driving transistor DT.

It should be added that the polarity of the above-described first switching transistor, the second switching transistor, the third switching transistor, the fourth switching transistor, and the fifth switching transistor is of the N type.

Figure 9:
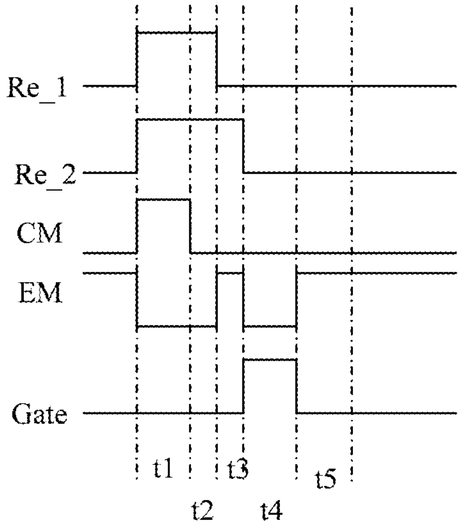
FIG. 9 is a timing chart corresponding to the second pixel driving circuit in embodiments of the present disclosure.

Referring to FIG. 9, after describing the circuit connection of the above-described pixel driving circuit, the following describes in detail the operating process of the above-described pixel driving circuit in conjunction with the timing chart.

At a stage of timing t1: Re_1=1, Re_2=1, CM=1, EM=0, and Gate=0.

When the first reset signal terminal Re_1 is at a high voltage, the fourth switching transistor is turned on, the signal at the reference signal terminal Vref reaches the third node N3 through the turned-on fourth switching transistor, and the voltage of the third node N3 is Vref. When the second reset signal terminal Re_2 is at a high voltage, the fifth switching transistor is turned on, and the signal at the initialization signal terminal Vinit reaches the first node N1 through the turned-on fifth switching transistor. Meanwhile, the signal at the compensation signal terminal CM is a high voltage, the first switching transistor is turned on, and the signal Vinit at the initialization signal terminal reaches the second node N2 via the first node N1 and the turned-on first switching transistor. Since Vinit is greater than Vref, the driving transistor DT is provided with the gate-source voltage Vgs=Vinit−Vref, and Vgs is greater than Vth, the driving transistor DT is turned on.

At a stage of timing t2: Re_1=1, Re_2=1, CM=0, EM=0, and Gate=0.

When the first reset signal terminal Re_1 is at a high voltage, the fourth switching transistor is turned on, the signal at the reference signal terminal reaches the third node N3 through the turned-on fourth switching transistor, and the voltage at the third node N3 is Vref. When the second reset signal terminal Re_2 is at a high voltage, the fifth switching transistor is turned on, and the signal Vinit at the initialization signal terminal reaches the first node N1 through the turned-on fifth switching transistor. Meanwhile, the signal at the compensation signal terminal CM is a low voltage, and the first switching transistor is turned off. The signal at Vref at the reference signal terminal reaches the second node N2 through the turned-on fourth switching transistor and the turned-on driving transistor, and the voltage of the second node N2 is Vref.

At a stage of timing t3: Re_1=0, Re_2=1, CM=0, EM=1, and Gate=0.

When the first reset signal terminal Re_1 is at a low voltage, the fourth switching transistor is turned off. When the second reset signal terminal Re_2 is at a high voltage, the fifth switching transistor is turned on. The signal at the compensation signal terminal CM is a low voltage, and the first switching transistor is turned off. The signal at the control signal terminal EM is a high voltage, and the third switching transistor is turned on. The signal at the first power supply terminal Vdd reaches the second node N2 via the turned-on third switching transistor and the driving transistor. In the process of changing the voltage of the second node N2 to VDD, specifically, when the voltage of the second node N2 changes to Vinit−Vth, the driving transistor is turned off, the gate-source voltage of the driving transistor is reset, and the threshold voltage Vth of the driving transistor is written into the first node N1.

At a stage of timing t4: Re_1=0, Re_2=0, CM=0, EM=0, and Gate=1.

When the first reset signal terminal Re_1 is at a low voltage, the fourth switching transistor is turned off. When the second reset signal terminal Re_2 is at a low voltage, the fifth switching transistor is turned off. When the signal at the compensation signal terminal CM is a low voltage, the first switching transistor is turned off. When the signal at the control signal terminal EM is a low voltage, the third switching transistor is turned off. When the signal at the scanning signal terminal Gate is a high voltage, the second switching transistor is turned on, and the data voltage of the data signal terminal Vdata is input into the gate of the driving transistor. At a stage of timing stage t5: Re_1=0, Re_2=0, CM=0, EM=1, and Gate=0.

When the first reset signal terminal Re_1 is at a low voltage, the fourth switching transistor is turned off. When the second reset signal terminal Re_2 is at a low voltage, the fifth switching transistor is turned off. When the signal at the compensation signal terminal CM is a low voltage, the first switching transistor is turned off. When the signal at the control signal terminal EM is a high voltage, the third switching transistor is turned on. The driving transistor is turned on under the action of the first power supply terminal Vdd, and the data voltage at the gate of the transistor causes the light-emitting device LED to emit light via the turned-on driving transistor. The second switching transistor is turned off when the signal at the scanning signal terminal Gate is a low voltage.

Equation (1)

The above−described light− emitting device *LED* is provided with the light−emitting current =

-continued $$1/2k(Vgs-Vth)^2.$$

In the above Equation (1), k is a constant, Vgs is the gate-source voltage of the driving transistor, and Vth is the threshold voltage of the driving transistor.

$$\text{The driving transistor is provided with the gate–source voltage } Vgs=(Vdata-Vinit)*(Coled/C1+Coled)+Vth. \quad \text{Equation (2)}$$

In the above Equation (2), Vdata is the data voltage at the data signal terminal, Vinit is the initialization signal at the initialization signal terminal, Coled is the capacitance value of the light-emitting device, C1 is the capacitance value of the first capacitor, and Vth is the threshold voltage of the driving transistor.

$$\text{Equation (2) is substituted into Equation (1) to simplify Equation for the light–emitting current } I = 1/2k[(Vdata-Vinit)*(Coled/C1+Coled)+Vth-Vth]^2 = 1/2k[(Vdata-Vinit)*(Coled/C1+Coled)]^2. \quad \text{Equation (3)}$$

$$\text{That is, it is obtained the light–emitting current } I = 1/2k[(Vdata-Vinit)*(Coled/C1+Coled]^2.$$

From the above equation (3), it can be seen that the light-emitting current of the light-emitting device is independent of the threshold voltage Vth of the driving transistor by the setting of the pixel driving circuit described above.

In the above Equation (3), k is a constant, Vdata is the data voltage at the data signal terminal, Vinit is the initialization signal at the initialization signal terminal, Coled is the capacitance value of the light-emitting device, and C1 is the capacitance value of the first capacitor.

$$\text{Further, after adding the above–described second capacitor, the light–emitting device is provided with the light–emitting current I} = 1/2k[Vdata-Vinit)*(Coled+C2/C1+Coled+C2)]^2. \quad \text{Equation (4)}$$

In the above Equation (4), k is a constant, Vdata is the data voltage at the data signal terminal, Vinit is the initialization signal at the initialization signal terminal, Coled is the capacitance value of the light-emitting device, C1 is the capacitance value of the first capacitor, and C2 is the capacitance value of the second capacitor.

Based on the same inventive concept, a display device is provided in the embodiments of the present disclosure, including the above-described pixel driving circuit.

In the embodiments of the present disclosure, the display device may be: a cellular phone, a tablet computer, a television set, a monitor, a laptop computer, a digital photo frame, a navigator, and any other product or component having a display function. The other essential components of the display device are understood by those of ordinary skill in the art, and are not described herein, nor should they be used as a limitation of the present disclosure.

Figure 10:
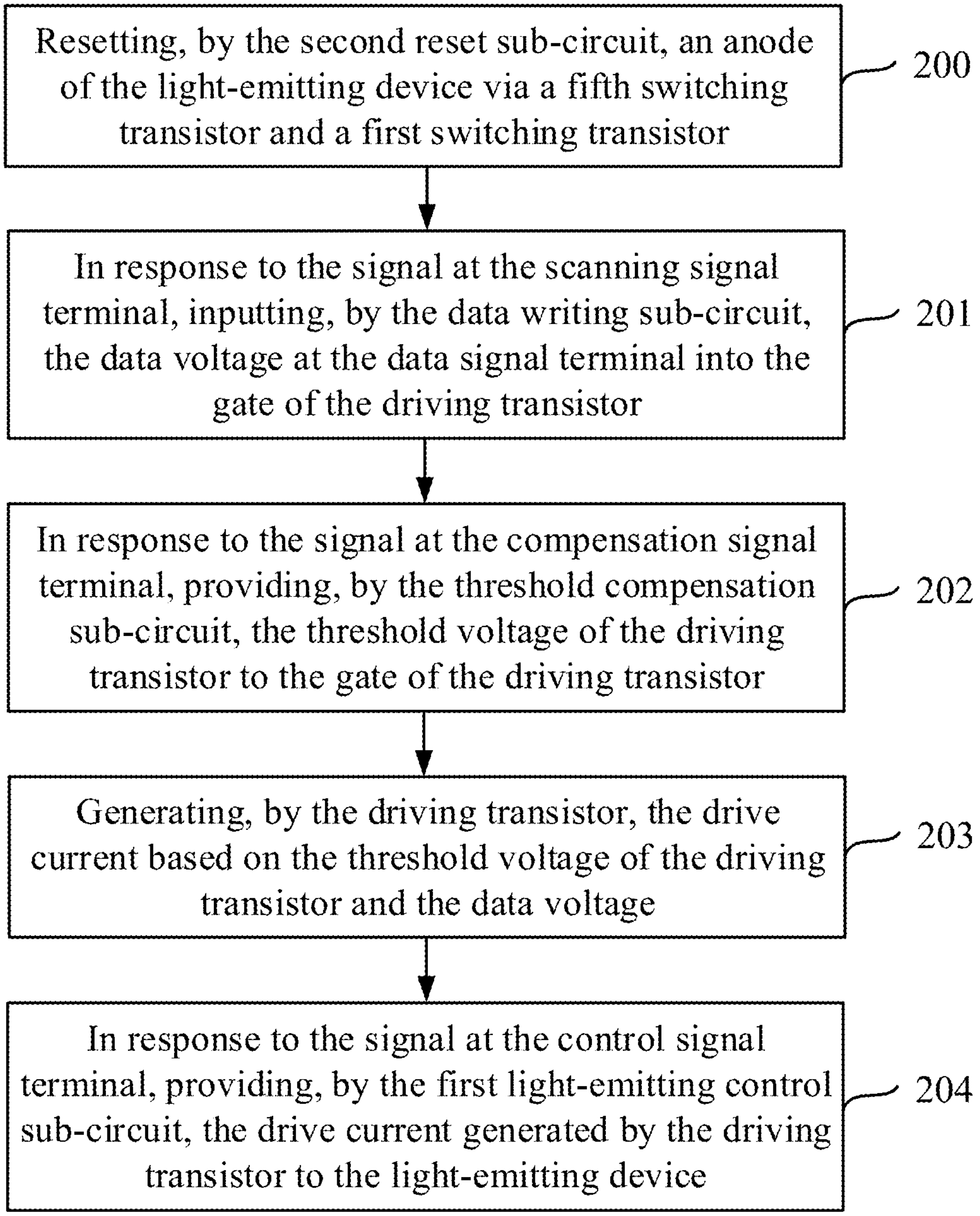
FIG. 10 is a flowchart of a driving method of a pixel driving circuit in embodiments of the present disclosure.

Based on the same inventive concept, embodiments of the present disclosure provide a driving method of a pixel driving circuit, shown with reference to FIG. 10, including the following.

At step 200: the second reset sub-circuit resets an anode of the light-emitting device via the fifth switching transistor and the first switching transistor.

At step 201: the data writing sub-circuit inputs the data voltage at the data signal terminal into the gate of the driving transistor in response to the signal at the scanning signal terminal.

During the implementation, when the signal at the scanning signal terminal is at a high level, the second switching transistor is turned on, and the data voltage at the data signal terminal is input into the gate of the driving transistor through the second switching transistor and the first node.

At step 202: the threshold compensation sub-circuit, in response to the signal at the compensation signal terminal, provides the threshold voltage of the driving transistor to the gate of the driving transistor.

During the implementation, when the signal at the compensation signal terminal is at a high level, the first switching transistor is turned on, and the threshold voltage of the driving transistor is provided to the gate of the driving transistor via the turned-on first switching transistor.

At step 203: the driving transistor generates the drive current based on the threshold voltage of the driving transistor and the data voltage.

During the implementation, at the light-emitting, the driving transistor generates the drive current according to the established current equation data voltage and the threshold voltage of the driving transistor.

At step 204: the first light-emitting control sub-circuit, in response to the signal at the control signal terminal, provides the drive current generated by the driving transistor to the light-emitting device.

At the light-emitting stage, when the signal at the control signal terminal is at a high level, the third switching transistor is turned on, and the drive current generated by the driving transistor is provided to the light-emitting device.

In summary, the pixel driving circuit, the display device, and the driving method are provided in the embodiments of the present disclosure. The pixel driving circuit includes: the driving transistor, the light-emitting device, the data writing sub-circuit, the threshold compensation sub-circuit, and the first light-emitting control sub-circuit; where the driving transistor is configured to, based on the threshold voltage of the driving transistor and the data voltage, generate the drive current; the data writing sub-circuit is coupled to the gate of the driving transistor, and is configured to, in response to the signal at the scanning signal terminal, input the data voltage at the data signal terminal into the gate of the driving transistor; the threshold compensation sub-circuit is coupled to the driving transistor, and is configured to, in response to the signal at the compensation signal terminal, provide the threshold voltage of the driving transistor to the gate of the driving transistor; and the first light-emitting control sub-circuit is coupled to the driving transistor, and is configured to, in response to the signal at the control signal terminal, provide the drive current generated by the driving transistor to the light-emitting device. The above-described pixel drive circuit is provided to eliminate the effect of oxide characteristics on the current of the pixel driving circuit, and to improve the stability of the light emission of the light-emitting device in the pixel driving circuit.

It should be appreciated by those skilled in the art that the embodiments of the present disclosure may be provided as methods, systems, or computer program product systems. Thus, the present disclosure may take the form of a fully hardware embodiment, a fully software embodiment, or an embodiment that combines software and hardware aspects. Further, the present disclosure may take the form of a computer program product system implemented on one or more computer-usable storage media (including, but not limited to, disk memory, compact disc-read-only memory (CD-ROM), optical memory, and the like) that contain computer-usable program codes therein.

The present disclosure is described with reference to flowcharts and/or block diagrams of methods, devices (systems), and computer program product systems according to the present disclosure. It should be understood that each of the processes and/or blocks in the flowchart and/or block diagram, and the combination of processes and/or blocks in the flowchart and/or block diagram, may be implemented by computer program instructions. These computer program instructions may be provided to a processor of a general-purpose computer, a special-purpose computer, an embedded processor, or other programmable data-processing device to produce a machine such that the instructions executed by the processor of the computer or other programmable data-processing device produce an apparatus for carrying out the function specified in the one or more processes of the flowchart and/or one or more blocks of the block diagram.

These computer program instructions may also be stored in computer-readable memory capable of directing the computer or other programmable data processing device to operate in a particular manner such that the instructions stored in the computer-readable memory produce an article of manufacture including an instruction apparatus that implements the function specified in the one or more processes of the flowchart and/or one or more blocks of the block diagram.

These computer program instructions may also be loaded onto a computer or other programmable data processing device such that a series of operational steps are performed on the computer or other programmable device to produce computer-implemented processing, such that the instructions executed on the computer or other programmable device provide steps for implementing the function specified in the one or more processes of the flowchart and/or one or more blocks of the block diagram.

Obviously, those skilled in the art can make various changes and variations to the present disclosure without departing from the spirit and scope of the present disclosure. Thus, to the extent that such modifications and variations of the present disclosure are within the scope of the present claims and their technical equivalents, the present disclosure is intended to encompass such modifications and variations.

What is claimed is:

1. A pixel driving circuit, comprising: a driving transistor, a light-emitting device, a data writing sub-circuit, a threshold compensation sub-circuit, a first light-emitting control sub-circuit, and a second light-emitting control sub-circuit; wherein the driving transistor is configured to, based on a threshold voltage of the driving transistor and a data voltage, generate a drive current;

the data writing sub-circuit is coupled to a gate of the driving transistor, and is configured to, in response to a signal at a scanning signal terminal, input the data voltage at a data signal terminal into the gate of the driving transistor;

the threshold compensation sub-circuit is coupled to the driving transistor, and is configured to, in response to a signal at a compensation signal terminal, provide the threshold voltage of the driving transistor to the gate of the driving transistor;

the first light-emitting control sub-circuit is coupled to the driving transistor, and is configured to, in response to a signal at a control signal terminal, provide the drive current generated by the driving transistor to the light-emitting device;

a second electrode of the driving transistor is coupled to the light-emitting device and the threshold compensation sub-circuit via the second light-emitting control sub-circuit; and the second light-emitting control sub-circuit is configured to, in response to the signal at the control signal terminal, make conduction between the second electrode of the driving transistor and the light-emitting device.

2. The pixel driving circuit according to claim 1, wherein the threshold compensation sub-circuit comprises a first switching transistor and a first capacitor; wherein a control terminal of the first switching transistor is coupled to the compensation signal terminal, a first terminal of the first switching transistor is coupled to the gate of the driving transistor, and a second terminal of the first switching transistor is coupled to the second electrode of the driving transistor; and a first terminal of the first capacitor is coupled to the gate of the driving transistor, and a second terminal of the first capacitor is coupled to the second electrode of the driving transistor.

3. The pixel driving circuit according to claim 1, wherein the data writing sub-circuit comprises a second switching transistor; wherein a control terminal of the second switching transistor is coupled to the scanning signal terminal, a first terminal of the second switching transistor is coupled to the data signal terminal, and a second terminal of the second switching transistor is coupled to the gate of the driving transistor.

4. The pixel driving circuit according to claim 1, wherein the first light-emitting control sub-circuit comprises a third switching transistor; wherein a control terminal of the third switching transistor is coupled to the control signal terminal, a first terminal of the third switching transistor is coupled to a first power supply terminal, and a second terminal of the third switching transistor is coupled to a first electrode of the driving transistor.

5. The pixel driving circuit according to claim 1, further comprising: a first reset sub-circuit; wherein the first reset sub-circuit is coupled to a first electrode of the driving transistor, and is configured to, in response to a signal at a first reset signal terminal, provide a signal at a reference signal terminal to the first electrode of the driving transistor.

6. The pixel driving circuit according to claim 5, wherein the first reset sub-circuit comprises a fourth switching transistor; wherein a control terminal of the fourth switching transistor is coupled to the first reset signal terminal, a first terminal of the fourth switching transistor is coupled to the reference signal terminal, and a second terminal of the fourth switching transistor is coupled to the first electrode of the driving transistor.

7. The pixel driving circuit according to claim 1, further comprising: a second reset sub-circuit; wherein the second reset sub-circuit is coupled to the gate of the driving transistor, and is configured to, in response to a signal at a second reset signal terminal, provide an initialization signal at an initialization signal terminal to the gate of the driving transistor.

8. The pixel driving circuit according to claim 7, wherein the second reset sub-circuit comprises a fifth switching transistor; wherein a control terminal of the fifth switching transistor is coupled to the second reset signal terminal, a first terminal of the fifth switching transistor is coupled to the initialization signal terminal, and a second terminal of the fifth switching transistor is coupled to the gate of the driving transistor.

9. The pixel driving circuit according to claim 1, wherein the second light-emitting control sub-circuit comprises a sixth switching transistor; wherein a control terminal of the sixth switching transistor is coupled to the control signal terminal, a first terminal of the sixth switching transistor is coupled to the second electrode of the driving transistor, and a second terminal of the sixth switching transistor is coupled to the light-emitting device.

10. The pixel driving circuit according to claim 1, further comprising: a second capacitor; wherein a first electrode of the second capacitor is coupled to the second electrode of the driving transistor, and a second electrode of the second capacitor is coupled to a fixed voltage signal terminal; wherein the fixed voltage signal terminal is a first power supply terminal or a second power supply terminal.

11. The pixel driving circuit according to claim 1, wherein the driving transistor is a single-gate transistor or a double-gate transistor; wherein when the driving transistor is the double-gate transistor, a first gate of the driving transistor is coupled to the data writing sub-circuit, and a second gate of the driving transistor is coupled to a second power supply terminal.

12. The pixel driving circuit according to claim 1, wherein a first switching transistor in the threshold compensation sub-circuit, a second switching transistor in the data writing sub-circuit, a third switching transistor in the first light-emitting control sub-circuit, a fourth switching transistor in a first reset sub-circuit in the pixel driving circuit, and a fifth switching transistor in a second reset sub-circuit in the pixel driving circuit have an N-type polarity.

13. A display device, comprising the pixel driving circuit according to claim 1.

14. A driving method of the pixel driving circuit according to claim 1, comprising:

resetting, by a second reset sub-circuit, an anode of the light-emitting device via a fifth switching transistor and a first switching transistor;

in response to the signal at the scanning signal terminal, inputting, by the data writing sub-circuit, the data voltage at the data signal terminal into the gate of the driving transistor;

in response to the signal at the compensation signal terminal, providing, by the threshold compensation sub-circuit, the threshold voltage of the driving transistor to the gate of the driving transistor;

generating, by the driving transistor, the drive current based on the threshold voltage of the driving transistor and the data voltage; and in response to the signal at the control signal terminal, providing, by the first light-emitting control sub-circuit, the drive current generated by the driving transistor to the light-emitting device.

* * * * *